United States Patent [19]
Reynolds

[11] Patent Number: 5,758,161
[45] Date of Patent: May 26, 1998

[54] TESTING METHOD FOR CHECKING THE COMPLETION OF ASYNCHRONOUS DISTRIBUTED COLLECTIVE OPERATIONS

[75] Inventor: David Corder Reynolds, West Hurley, N.Y.

[73] Assignee: International Business Machines Corporation, Armonk, N.Y.

[21] Appl. No.: 655,354

[22] Filed: May 24, 1996

[51] Int. Cl.$^6$ .................................................... G06F 9/46
[52] U.S. Cl. ........................... 395/678; 395/682; 395/569
[58] Field of Search ............................. 395/682, 680, 395/651, 653, 678, 569, 677, 672

[56] References Cited

U.S. PATENT DOCUMENTS

| | | |
|---|---|---|
| 4,489,379 | 12/1984 | Lanier et al. . |
| 4,665,520 | 5/1987 | Strom et al. . |
| 4,849,964 | 7/1989 | Van Baardewijk . |
| 5,179,669 | 1/1993 | Peters . |
| 5,191,578 | 3/1993 | Lee . |
| 5,218,680 | 6/1993 | Farrell et al. . |
| 5,287,473 | 2/1994 | Mohan et al. . |
| 5,319,639 | 6/1994 | Guha . |
| 5,321,813 | 6/1994 | McMillen et al. . |
| 5,412,784 | 5/1995 | Rechtschaffen et al. . |
| 5,421,014 | 5/1995 | Bucher ................................. 395/678 |
| 5,493,668 | 2/1996 | Elko et al. . |
| 5,495,474 | 2/1996 | Olnowich et al. . |
| 5,515,538 | 5/1996 | Kleiman ................................ 395/678 |
| 5,630,137 | 5/1997 | Carney et al. ........................ 395/678 |
| 5,642,507 | 6/1997 | Iwazaki ................................ 395/678 |

FOREIGN PATENT DOCUMENTS 7282011  10/1995  Japan .

OTHER PUBLICATIONS

E. Ammann, IBM Technical Disclosure Bulletin, "Parallel Data Transfer Operations", vol. 34, 10B, pp. 245–246, Mar., 1992.

Ekanadham et al., IBM Technical Disclosure Bulletin, "Metaparallelism" vol. 36, No. 07, pp. 523–527; Jul., 1993.

Patel et al., IBM Technical Disclosure Bulletin, The Helix Switch: Single Chip Asynchronous Transfer Mode Switch Architecture, vol. 38, No. 12, pp. 17–18, Dec., 1995.

Primary Examiner—Kevin A. Kriess
Attorney, Agent, or Firm—Lily Neff

[57] ABSTRACT

A method for testing the completion of a command issued earlier in a multiprocessing system having a plurality of nodes. During an initialization phase, each command has been identified by a handle and a record containing the task to be performed asynchronously had been established. When a request for checking the completion of a command is issued, the pre-established record is simply checked for location of last task executed and completed. If the last or most current task is not the last task before the completion of the total command, the user application can choose to either continue the operation of command processing or permanently or temporarily abandon it.

15 Claims, 3 Drawing Sheets

5,758,161

TESTING METHOD FOR CHECKING THE COMPLETION OF ASYNCHRONOUS DISTRIBUTED COLLECTIVE OPERATIONS

FIELD OF INVENTION

This invention is directed to a testing method of checking the completion of command for performing asynchronous distributed collective operations in a parallel processing computer system, and in particular one that supports multistage algorithms and the mixing of blocking and non-blocking operations between tasks.

BACKGROUND OF THE INVENTION

In a computer system environment, an application program interface (hereinafter an API) is a functional interface supplied by the operating system that allows an application program written in a high-level language to use specific data or functions of the operating system. In some instances an API acts as the interface through which an application program interacts with an access method. For example in VTAM programs, an API functions as a language structure used in control blocks so that application programs can interface the control blocks and be identified to VTAM. In addition, in a multi-tasking operating system, application program requests are made to the operating system through the API so that a request automatically starts a task or a process to be completed.

The function of an API is even more important in a parallel processing environment. In parallel processing environments, the computer architecture uses many interconnected processors to access large amounts of data in order to simultaneously process a large number of tasks at high speeds. In such environments, the multi-tasking operating system relies heavily on the API for timely task processing.

To perform the required task processing in a timely manner, many API's define a set of collective operations for performing complex communications between the groups of processes. One such API used in distributed parallel processing is the Message Passing Interface (hereinafter, MPI) standard that uses and defines many collective operations. Some examples of such collective operations include certain functions like "broadcast", "reduce", "scatter", "gather", "all-to-all", and "barrier". MPI is currently being adopted by many manufacturers of parallel processors.

There are several advantages associated with collective operations, among which are ease of use and performance. Collective operations make creating complex communication patterns easy by encapsulating multi-stage communication algorithms in a single subroutine call, and they allow optimization for specific hardware platforms by leaving the choice of implementation of algorithms to the API developer.

There is, however, one major disadvantage with the use of collective operations. In most instances, many of these collective operations are synchronous, and they "block" the processor until it is time for the performance of the task. In other words, if a collective operation is invoked by one parallel task, that task must wait until all other tasks have invoked the operation before continuing. So synchronous collective operations force faster tasks to waste time waiting for slower ones, which can create serious performance problems for some applications.

The solution for applications whose tasks are not inherently synchronized is to use "non-blocking" or asynchronous collective operations. Non-blocking operations allow each task to proceed at its own pace, and could periodically be tested for completion or "waited" for if necessary. However, MPI and other well known message passing API's do not define such a set of asynchronous collective operations. The main reason that so many message passing API's do not define asynchnchronous collective operations is that many collective operations use multi-stage algorithms in which the output from one stage is the input to the next stage of operation. Therefore, the sends and receives of the next stage (N+1th stage) cannot be posted until the current stage (Nth stage) has been completed.

Therefore, it is highly desirable to design a method of asynchronous distributed collective operations that allows mixing of blocking and non-blocking operations between tasks as to improve the performance and efficiency of the environment while still maintaining the capability of handling multi-stage operations.

SUMMARY OF THE INVENTION

The present invention provides a method of checking for completion of any previously issued non-blocking command requests in a multiprocessing system having a plurality of nodes. The method comprises performing an initialization step during which any issued command is identified and a record is established to show the order of tasks to be performed asynchronously. A pointer is then assigned in the record to indicate the most current operation being performed. Pointer is moved every time a task is completed to indicate the current status.

Upon receiving a completion status request by a user application, by utilizing the assigned pointer, the last completed task is determined. If it the last task performed does not complete the entire requested command, the user application is informed that the command is not completed. User application can then either choose to abandon further processing of the command, temporarily suspend it or request processing continuation.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION OF THE INVENTION

In non-blocking environments where asynchronous collective operations are used, the operation as a whole is not allowed to "block" any of the tasks or processor time. Because of this dependency, no single stage of the process can block the operation either. In general, as explained earlier. MPI and other similar API's that use multi-staging algorithms do not employ non-blocking type operations because of this same reason. In other words, where there are internal dependencies, once the process encounters a stage where the output from one stage becomes the input to the next stage, since the process cannot block any stage of the operation, the collective operation can no longer continue and is forced to return control to the user.

Once the control has been returned to the user, other related problems occur. One main concern after the control has been returned to the user is the issue of notifying the user if and once the original internal dependency has been resolved. A second related issue, is even if there is a way of providing for such a notification, once the user decides to return to the original process, the system environment has to find a way to continue the operations at the same exact location where it was interrupted because of the previous dependency.

One solution may be to disallow the system to accept algorithms which contain internal dependencies. Although this is possible for some types of collective operations, it is not possible for those that perform reduction or other functions which are not purely message passing. This proposed solution also precludes the major performance advantages provided by multistage receive-and-forward type algorithms. Yet another disadvantage with the above-mentioned proposed solution is that it does not allow blocking and non-blocking operations to be mixed between nodes, as is often desirable. (Such mixing is only possible if the blocking and non-blocking operations generate identical communication patterns. So, if the blocking operations use multistage algorithms, the non-blocking operations must also use this type of algorithm.)

Figure 1:
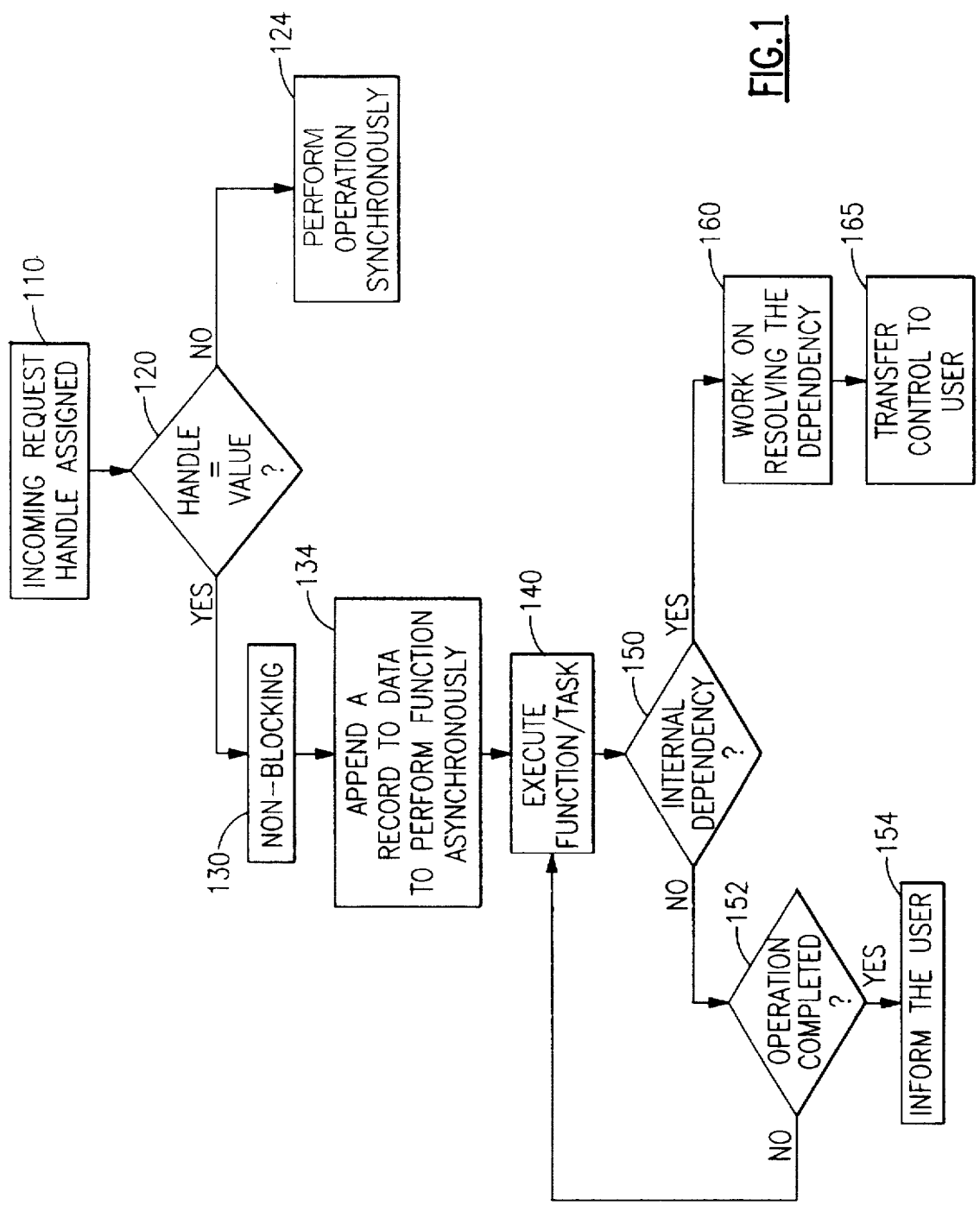
FIG. 1 is a flowchart illustrating the function of one embodiment of the present invention.

FIG. 1 is an illustration of a flowchart illustrating an embodiment of the present invention. When a request is received, before the task is performed a request handle 110 is assigned. The environment, in assigning the request handle will determine if the operation or task to be performed is blocking or non-blocking 120. If the task to be performed is a blocking task, the request handle, will be assigned a NULL value. Otherwise, the task is non-blocking and the system will append a record to a data structure 134 for performing the task or the function asynchronously 140.

The system environment consists of an enhanced set of support macros which do not require any additional algorithmic codes. Examples of such macros include but are not limited to "SEND", "RECEIVE", "COPY", and "REDUCE". In one embodiment of the present invention's MPI collective functions, macros are used to perform such functions as SEND, RECEIVE, COPY, REDUCE, MALLOC, FREE, and WAIT.

When collective operations are to be implemented, the system simply modifies the existing macros to perform different functions depending on the mode of operation, i.e. blocking or non-blocking. It is important to note that one of the advantages of the present invention is that the same algorithms can be used both for blocking and non-blocking commands/mode. This is an important contribution since no code changes or any other changes need to be made to the algorithms in order to make them compatible with either blocking or non-blocking mode.

In one embodiment of the present invention, the request handle itself that differentiates between the blocking and non-blocking operations can become a part of an extended collective algorithm implemented. (The operation of the request handle can be further extended to test for completion of the call in the case of non-blocking operations 150 through 165, in FIG. 1.)

In blocking mode, when the handle is set to a null value (parameter is NULL), the macros can "sense" that the blocking mode is in effect by examining the request handle or parameter, and change their behavior accordingly. Essentially, if the mode is blocking, the macros actually perform the required function, such as SENDing a message.

In non-blocking mode a data structure (or a series of data structures) is formed by appending a record to the data structure containing the parameters required to perform the function asynchronously. When complete, this data structure can be traversed step by step, with control being returned to the user whenever a "blocking" operation is encountered, as illustrated in an example as shown in FIG. 3.

Figure 2:
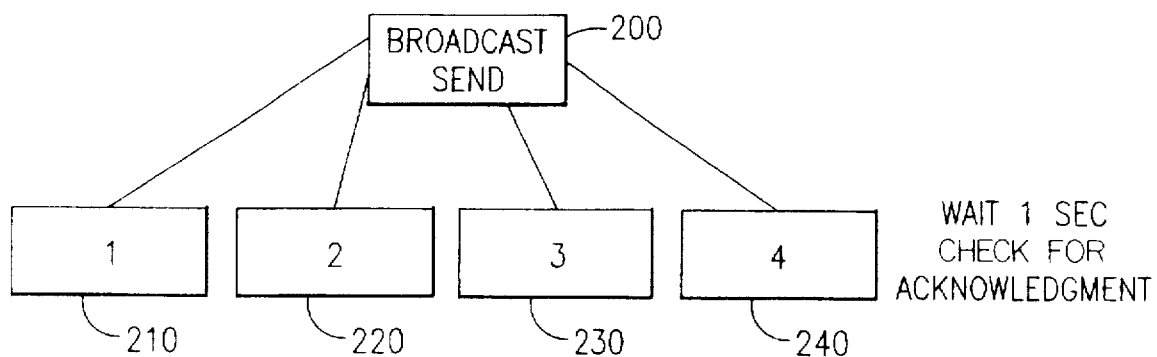
FIG. 2 is an illustration of broadcasting a message to different nodes.

Since in non-blocking mode, several tasks or operations can be performed asynchronously, it is necessary to form at least one data structure per operation or task. FIG. 2 illustrates such an example. In FIG. 2, the operation to be performed is a broadcast 200. Messages are being simultaneously sent to nodes 1 through 4, 210–240. The operation in 240, however, is slightly different than the SEND operations in 210 through 230. A different data structure is being set up for each operation 210 through 240. The data structure can be thought of as a road map for the operations to be performed. For example, in the case of 210 through 230, the data structure will only contain steps involved in sending the message to nodes 1 through 3, while in 240 the data structure not only includes the send operations but it also contain steps for waiting for a time period, and checking for the receipt of an acknowledgement.

In one embodiment it is possible to alter the sequence of steps in multistaging situations if internal dependencies can be avoided so that stage whose output is required is performed before the stage that takes the output as one of its inputs. In another embodiment, as explained above, the control is simply returned to the user whenever a "blocking" operation is encountered. In either case, once the data structure is formed, this data structure can be traversed step by step to avoid blocking issues. It is important to note that although some algorithms will produce data structures which can be traversed completely before control is returned to the user, the traversal process will generally be interrupted multiple times to avoid blocking.

Figure 3:
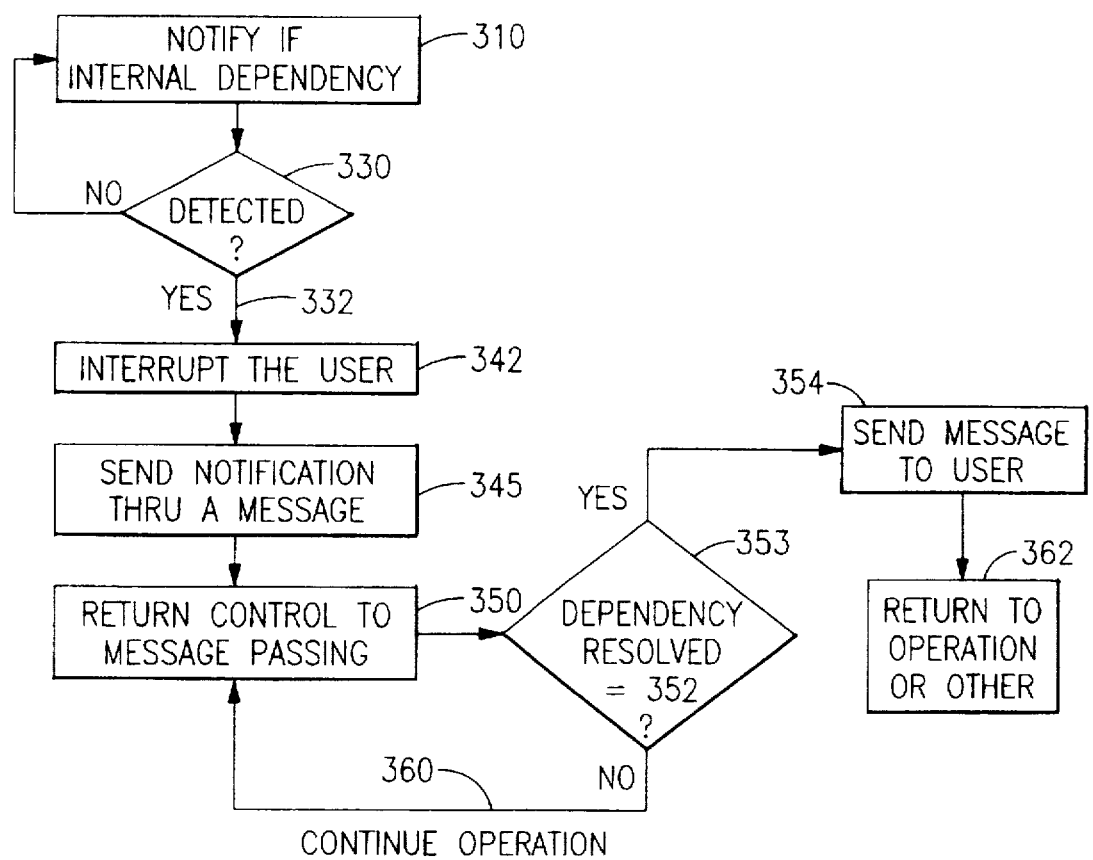
FIG. 3 is a flowchart illustrating one embodiment of the present invention when an internal dependency is detected.

FIG. 3 illustrates an example of a data structure, an originally non-blocking operation (FIG. 1, branch 130) containing an internal dependency. When an internal dependency is detected 330, the system becomes aware of it through a notification process 332–345. The control is then returned momentarily to the user 340, in this example by causing a hardware interrupt to occur 342 and a message to appear alerting the user to the fact 345. After the user is notified and the control returned to the user, the control is either returned back to the message passing interface as shown in FIG. 3 or in another embodiment the user is given the option of interrupting the operation or making other appropriate actions.

As shown in the example in FIG. 3, once the control is returned to the message passing interface 350, the interface retains control until the dependency is resolved 353, at which point the user is once more notified of this situation (for example by way of another interrupt). Once the control is switched from the user to the message passing interface, the message passing interface can engage in different activities including perhaps the processing of other stages of the operation not dependent on the blocking portion. The state of the operation is checked frequently to see if the dependency is resolved, in the mean time.

Once the dependency is resolved, the user again may be given the option of choosing to return to the operation or moving on to chose other actions. If the decision is to continue the operation, as in FIG. 3, since the data structure has kept account of when and where the dependency had occurred the operation can continue at the exact location where it was once interrupted without any inefficiencies.

Figure 4:
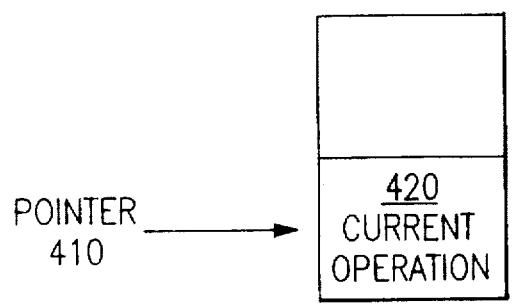
FIG. 4 shows a pointer identifying the most current operation to be performed.

In this way, the blocking portion of the process or the task becomes just another stage in the overall operation and turns into a non-blocking stage. A further example can be used for clarity. When the task to be performed is a SEND or a RECEIVE, in one instance, and a blocking operation is encountered, instead of ordinary sends and receives, the method of this invention changes the blocking operation to non-blocking operations by changing them to "send-and-call" and "receive-and-call" primitives which cause a user-defined callback function to be invoked when the message has completed. This call back function identifies which collective operation the message is part of, and continues traversal of its data structure at the point where it left off. In one embodiment, as shown in FIG. 4, this is done by each collective operation maintaining a pointer 410 which indicates the next function to be performed 420. So when there is a wait state or a dependency after the SEND or the RECEIVE, the pointer just moves to the CALL portion and waits for the call, notifying it of the resolution of the dependency.

Figure 5:
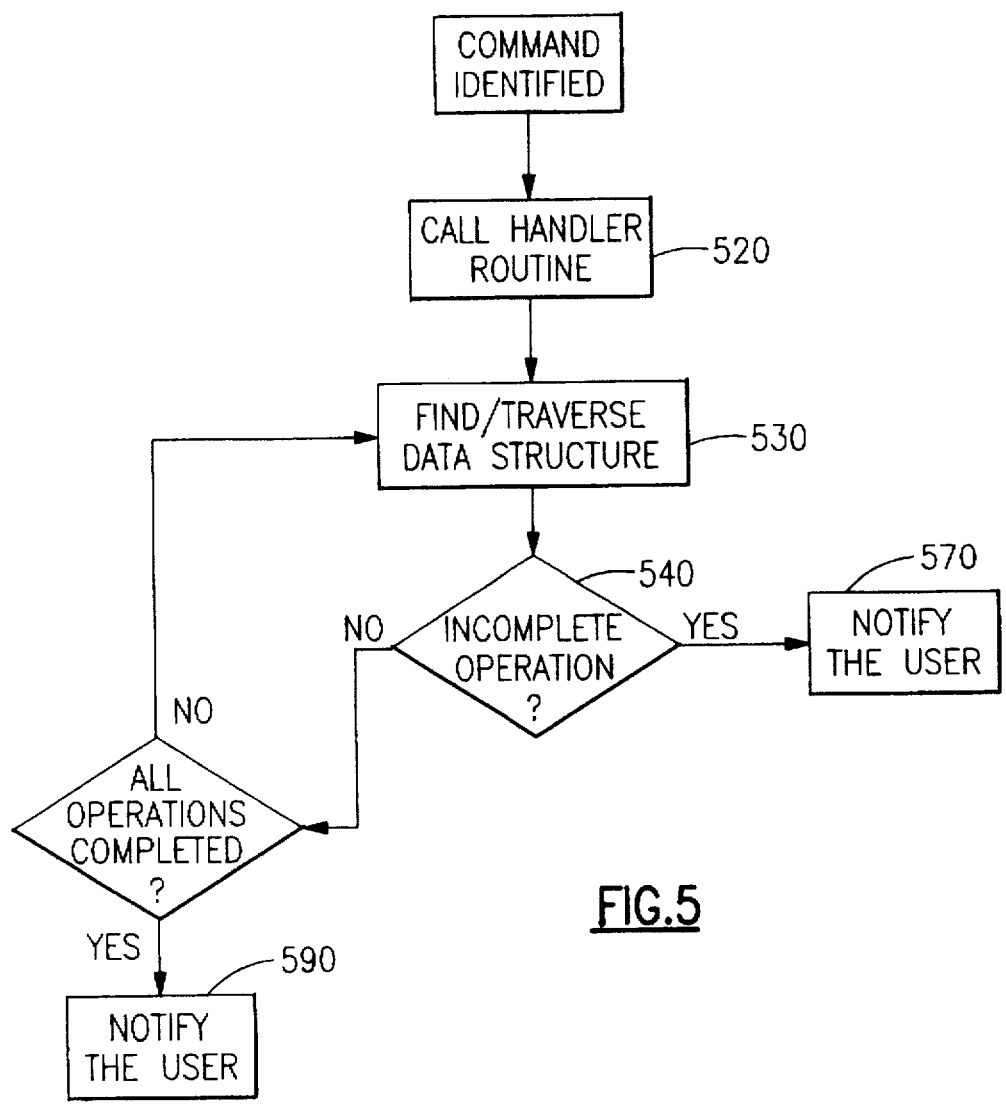
FIG. 5 is an illustration of Handler Routine as suggested by one embodiment of the present invention.

Because the data structure maintains a record of the steps to be performed and the position of each process that is being performed, it is easy for the user to test for the completion of the operation. An MPI Test Function is designed to examine the request handle and identify the request as a collective operation. As illustrated in FIG. 5, once the determination is completed and identified 510, the routine 520 is then called so that its data structure(s) can be examined 530. The routine traverses the data structure, and checks for incomplete operations 540. If one is found the user is informed that the collective operation is not complete 570. The traversal algorithm also checks for operations that have not yet been executed, and it tries to execute these. If the data structure is successfully traversed to the end, the user is informed that the operation is complete 590.

In one embodiment of the invention, if it is found that the data structure can not be successfully traversed to the end, the user is notified that the operation is not completed. The user can then inquire about a variety of information pertaining to completion of operation. For example, the user can inquire as to the percentage of the operation completed or remaining, time estimated to complete the operation or the like. In another embodiment, the system returns this data automatically whenever encountering an incomplete operation. The user can specify the information to be provided by the system when encountering an incomplete operation, alter the default options or add new ones, during an initialization process. The information, including but not limited to the percent completion or processing time left, can be estimated by the system either by initially constructing a look-up table identifying the time and percentage of each step to be completed based on previous information acquired, or by simply looking at the pointer or other readily available means. Other well known and developed methods exist and are appreciated by the persons skilled in the art.

In either case, the user under this embodiment is given a choice to continue, pause (temporarily suspending this task to request other tasks, but reserving the option of returning to the original task at a later time), or canceling the task or operation all together depending on the feedback provided.

If the task or operation is to be continued, the operation continues as before. In case the task or operation is to be abandoned, the data structure is cleared and the system notified that this operation is terminated. If a pause option has been selected, the data structure(s) and any relevant data is saved, but the system is notified that the task is to be abandoned for now and all relevant memory and/or hardware and software elements are reset accordingly. A new second task can now be started. When the user decides to return to processing of original (old) task, the stored information is retrieved and stored to the system when appropriate. The pointers are also saved, so that the system starts processing the operation at the same exact point where it was left off as if the interruption has not occurred. In this manner, the original task can be restarted with minimum efficiency impact.

In another embodiment, it is similarly implemented that when the user "waits" for a collective operation to complete, the same traversal algorithm is invoked, but control is not returned to the user until the operation is complete. If an incomplete send or receive is found, the algorithm blocks this until it is complete, and then the operation is complete. When the entire collective operation is complete, the data structure associated with it is freed for reuse.

Multiple simultaneous collective operations may be active on any MPI communicator. The collective operations internally assign unique tags to prevent interference between collective operations, and between collective and point-to-point operations.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. In a multiprocessor system having multiple nodes with each node having a user application for requesting performance of a non-blocking command, a method of checking for completion of any previously issued non-blocking command requests, said method comprising the steps of:

performing an initialization step during which upon issuance of a non-blocking command a request handle is assigned to said non-blocking command for purposes of identifying said command, said initialization step also involving building a data structure per task involved in processing said command and executing in order, the sequence of functions recorded in said data structure(s);

assigning a pointer in said data structure(s) to indicate most current operation being performed, said pointer being moved to next current operation upon the completion of said most current operation;

upon receiving a completion status request by said user application, finding said most current operation being performed by examining said pointer location;

examining said most current operation to identify if said operation was completed;

if said most current operation was completed, examining said data structure(s) to see if said most current operation completed was a last operation to be performed before completion of said entire requested command; and notifying said user application a message indicating if said requested command was completed or if said command is still being processed.

2. The method of claim 1, wherein said user application is notified that said requested command is still being processed, further comprising the step of asking said user application if said user application would like to continue processing said requested command.

3. The method of claim 2, wherein said user application chooses not to continue processing said requested command, further comprising the step of inquiring if said user application would like to temporarily or permanently terminate processing of said requested command.

4. The method of claim 3, wherein said user application selects to permanently terminate processing said requested command, further comprising the steps of:
    stopping all processing operations;
    reinitializing said data structure and pointer for next request to be processed;
    notifying said user application that said operation processing has been canceled.

5. The method of claim 3, wherein said user application selects to temporarily terminate said processing of said requested command, further comprising the steps of:
    storing any said data structure(s) relating to said requested command in a memory location;
    preserving any data from other already completed operations in a memory location; and
    preserving said location of said pointer so that upon resuming of said command processing at a later time, only non-processed portion of said command will be processed and said previously processed operations would not be duplicated.

6. The method of claim 2, wherein said user application requests information about percentage completion of said requested command before deciding the desirability of further processing of said command, comprising the step of: examining said data structure and position of said pointer to indicate percentage completion; and notify said user application of said information.

7. The method of claim 2, wherein said user application requests information about estimated time remaining for said completion of said requested command before deciding further desirability of continuing with the processing of said command, comprising the steps of:
    building a time estimator table during said initialization step, said table indication estimated processing time relating to many operations and tasks;
    continually updating said time estimator table every time an operation is performed that does not exist in said estimator table;
    upon receiving said remaining estimated time request, examining said position of said pointer to determine last completed operation;
    examining said data structure(s) to determine what portion of said requested command still needs to be processed;
    calculating processing estimated time remaining by looking up estimated processing time for all remaining operations to be performed obtained from said data structure(s), from said time estimator table; and
    notifying said user application of said estimated processing time remaining.

8. The method of claim 7, wherein a user requests the percentage completion of a requested command, further comprising the steps of:
    examining said time estimator table and said remaining operations to be performed;
    calculating said processing time for said entire requested command;
    calculating said remaining operations or said processed operation, whichever is smaller; and
    calculating percent completed and notifying said user application.

9. The method of claim 1, further comprising returning control to user application whenever during processing said requested command reaching a function that cannot be executed due to an internal dependency which requires some other operation to be completed before execution, whereby said user application may perform other, unrelated operations; providing a handler routine to notify said user application when said internal dependency is resolved and removing said control away from said user application to continue with executing said requested non-blocking command.

10. The method of claim 7, further comprising the steps of:
    returning control to user application whenever during processing said requested command reaches a function that cannot be executed due to an internal dependency which requires some other operation to be completed before execution, whereby said user application may perform other, unrelated operations;
    examining said time estimator table and said pointer and said data structure(s) to inform said user application as to completion status of said requested command every time said control is returned to said user application;
    inquiring if said user application chooses to continue processing said application;
    temporarily or permanently discontinue processing said application if said option is chosen by said user application; and
    upon choosing continuous processing of said requested command, providing a handler routine to notify said user application when said internal dependency is resolved and upon said resolution removing said control away from said user application to continue with executing said requested non-blocking command.

11. The method of claim 1, wherein a message processing interface test function is designed to examine said data structure upon receipt of a status completion request, said test function traversing said data structure and checking for incomplete operations and informing said user application if any incomplete operations have been identified.

12. The method of claim 11, wherein said test function also traverses algorithms for operations not yet executed, said function executing any such said algorithms or operations not yet executed.

13. The method of claim 11, wherein said data structure is successfully traversed to the end without locating any incomplete operations, said method further comprising the step of informing said user application that said request command is completed.

14. The method of claim 2, wherein every time an incomplete command status is reported; said user application is also notified of a command percentage completion and an estimated remaining time of command processing completion.

15. The method of claim 14, wherein said percentage and remaining processing time completion is calculated from examining said data structure(s) in conjunction with an estimator table set up during said initialization step, said table being continually updated.

* * * * *